April 15, 1947.  R. H. HARKINS  2,418,878
MEANS FOR DIFFUSING REPELLENTS
Filed Oct. 27, 1943

INVENTOR.
Robert H. Harkins
BY Lancaster, Allwine and Rommel
ATTORNEYS.

Patented Apr. 15, 1947

2,418,878

UNITED STATES PATENT OFFICE 2,418,878

MEANS FOR DIFFUSING REPELLENTS

Robert H. Harkins, Mount Vernon, N. Y.

Application October 27, 1943, Serial No. 507,908

4 Claims. (Cl. 299—24)

This invention relates to receptacles for liquids, and more particularly to a receptacle of liquid-supporting material, adapted to be dipped into a volatile liquid, or otherwise to come into contact with such liquid, whereupon a volume of the liquid will be retained by the receptacle, so that the liquid carried thereby may be subsequently gradually diffused into the air.

A practical application of the novel receptacle or diffuser is in the gradual dissipation of volatile liquid repellents of animal, bird and insect life.

An important object of the invention is to provide a slender, inconspicuous receptacle and support therefor, carrying liquid supporting and retaining material, which may be dipped into a suitable volatile liquid, withdrawn therefrom, and suspended, or otherwise carried, adjacent a member to be protected from damage by animals, birds or insects in contradistinction to a device including a wick adapted to be in communication with a considerable volume of volatile liquid contained in a more or less large and conspicuous receptacle. In many cases and situations, such devices cannot be employed, due to their weight, conspicuousness and bulk.

Another important object is to provide a carrier of liquid-supporting material, for so-called repellent liquids, which may be hung from a branch or twig of a growing plant, shrub or tree, suspended from a suitable portion of an article of furniture, or stuck partly into the ground adjacent growing plants or shrubs and, while being inconspicuous, will retain, for gradual diffusion or dissipation, a volume of suitable repellent liquid greater than that naturally carried at any one time by the material mentioned.

Still another important object is to provide a carrier, as last described, which will not be apt to drip liquid after being dipped and suspended or hung as mentioned.

Another object of importance is to provide a carrier as described, having means for either hooking over or impaling upon a suitable support for suspending the carrier therefrom or for supporting the carrier upright or inclined, when stuck into the ground, yet the liquid will not creep up nor flow over this means and thus be wasted or cause damage to the support.

Yet another important object is to provide an inexpensive, readily manufactured carrier for a volume of repellent liquid, a number of which carriers may be readily packed with or accompany a marketable bottle or container of such liquid. For this reason it is important that the carriers be quite slender throughout their entire lengths, yet elongated, so that a relatively large space may be covered with the diffused liquid vapors.

Another object is to provide such a carrier or diffuser, which is adapted to function satisfactorily, no matter which end is uppermost, this being due to an inexpensive anti-drip guard at either end, which guards also have the dual function of retaining a volume of the repellent liquid to be gradually drawn upon, by capillary attraction, by the liquid supporting material for gradual diffusion.

Since it is possible to construction the body portion of the novel diffuser or carrier of material which may fray or have a slight tendency to unravel, the provision of the guards tends to prevent this.

Other objects and advantages of the invention will be apparent from the following detailed description, taken in connection with the accompanying drawing, forming a portion of this specification, and in which drawing.

Figure 1:
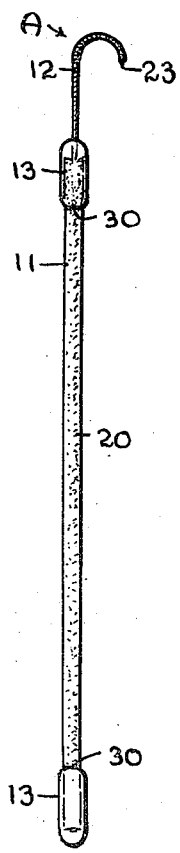
Figure 1 is a side elevation of the novel receptacle or diffuser.

In the drawing, wherein for the purpose of illustration is shown a preferred embodiment of the invention and wherein similar reference characters designate corresponding parts throughout the several views, the letter A designates the novel receptacle or diffuser and the letter B an example of a member to be protected from damage by the repellent liquid carried by A.

The novel receptacle or diffuser includes a body portion 10, liquid-supporting material 11 carried thereby, means 12 for supporting the body portion 10 either suspended or extending from a member B, and a guard 13 at either or one end of the body portion 10.

This elongated or slender body portion 10 may be of wire, suitable plastics, waxed cord or the like and it is preferred that the means 12 be an end elongation of the body portion 10, and this means 12 be inelastic, that is, the means 12 may be curved, bent or straightened out at will, and will retain its manipulated shape. Therefore, the body portion 10 may also be of such inelastic but pliable material. Preferably, the body portion 10 may comprise two substantially equal lengths 15 of suitable material intertwisted and carrying between the twists 16 thereof the inner ends of a plurality of suitable tufts 20 making up the liquid supporting material 11. One end or terminal 17 of the body portion may terminate in the two lengths 15 cut off squarely, while the other end or terminal 18 merges into the means 12.

The liquid-supporting material 11 may be spaced apart tufts 20 comprising fibres of cotton, wool, asbestos or the like, bristles, suitable cellulose materials, as paper, or any other suitable material which is absorbent in itself or is adapted to retain liquids (as tufts of bristles) and permit capillary attraction of liquids. The tufts 20 are shown as drawn together between the twists 16 so that they are substantially conical with their apices pointing inwardly toward the body portion 10. Thus, a plurality of open spaces 21 are provided between the inner end portions of adjacent tufts and this construction permits a considerable volume of liquid to be caught and retained within these spaces 21 when the diffuser or receptacle A is dipped into and then withdrawn from the liquid supply. However the wider or outer portions of the tufts generally touch each other and the entire assembly of tufts has been found ideal for capillary attraction of liquid upwardly from the lowermost part of the diffuser A. Taken as a whole, the body of liquid supporting material 11 forms substantially a cylinder.

Since at least the means 12 for supporting the body portion 10 is of inelastic but bendable material, the member constituting this means may take the form of a curve, an angle or extend straight out, at the will of the manipulator. Thus, the means 12 may be hooked over or wound about a branch or twig, may be hooked into fabric or straightened out and stuck into the ground and, for these last reasons, the free end of the member may be pointed, as at 23.

Figure 2:
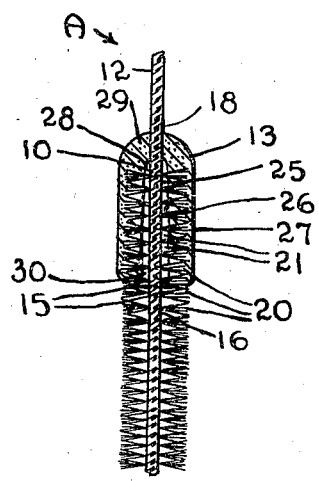
Figure 2 is an enlarged view of the terminal portions of the receptacle or diffuser of Figure 1.

Now, as to the guards or thimbles 13, these perform dual functions of considerable importance. It was discovered that, when the tufts were dipped into a suitable plastic such as wax, in liquid form, the plastic penetrated the tufts for a portion of their lengths but not to the body portion 10 and, of course, formed a solid coating (when hardened) outside the limits of the tufts. As a result a pocket 25 was formed about the body portion 10, defined by the arcuate inner face 26 of the arcuate side wall 27 of the guard 13, with its base 28 at substantially the last or terminal group of tufts, and a solid wall 29 of hardened plastic forming the closed end of the guard. The guards 13 may extend over only a small group of the tufts, as shown in Figure 2 where it will be noted that the outer portions of the tufts form a reinforcing for the guard side wall 27. The solid wall 29 has, preferably a rounded outer face, so it may readily contact the wall of the mouth of a bottle or other container of suitable liquid, in order to wipe excess liquid from the guard. The mouths 30 of the pockets 25 face toward the major or uncovered part of the liquid-supporting material 11. In the example shown in Figure 2, where two guards 13 are employed, the two mouths 30 face each other. These pockets 25, while small, retain a volume of liquid, even when the material 11 holds its maximum volume of liquid and this additional volume is drawn upon as the initial liquid carried by the material 11 is diffused into the atmosphere. As a result, the diffuser functions for a considerably greater period of time than one not provided with the pockets 25. The lowermost guard 13 prevents dripping of the liquid, while the uppermost guard prevents creeping of the liquid over the means 12 and consequent probable damage to the member B. The plastic, too, prevents fraying and unraveling of the body portion 10, particularly when the latter is constructed of wax-stiffened cord. The plastic comprising the guards 13 may be made of wax, suitable resins (natural or synthetic), cement or any other material which is not soluble in the liquid employed and, preferably, not water-soluble when hardened, and non-absorbent with respect to the liquid repellent.

Figure 3:
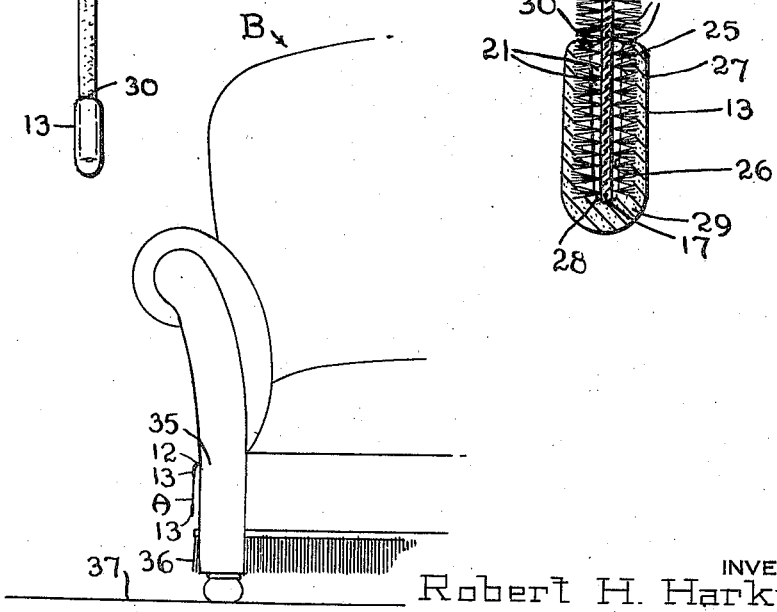
Figure 3 is a view illustrating one application of the novel receptacle or diffuser, suspended from a support.

The liquid may be any suitable one, as a preparation for use as a repellent against dogs and cats. A desirable number of the diffusers A may be dipped into a container of the repellent then hung upon the branches or twigs of shrubs, whereupon the guards 13 prevent both dripping of the repellent upon the foliage or creeping of the liquid along the means 11 and, in turn, over the twig or branch contacted by the means 11. Others of the diffusers may be stuck upright or inclined into the ground adjacent the bases of shrubs (by making a small hole in the soil with a stick or the like and then inserting the means 11) whereupon the guard 13 nearest the means 11 provides an upwardly opening pocket 25. Indoors, the diffuser may be suspended from the lower portion 35 of an article of furniture. In the example shown in Figure 3, the diffuser is relatively inconspicuous when suspended from the side wall. It will be noted that a fringe 36 and a floor covering, such as a rug 37, are directly below the diffuser A but dripping of liquid will be prevented by the guard 13.

The diffuser is, preferably, an elongated, slim article of commerce, inconspicuous and easily inserted into even a narrow necked bottle. One example of the size of the diffuser is an overall length of about six inches, with the widest portion, irrespective of the means 11, about one-quarter inch, this portion being the guard 13. The material 11 and/or material comprising the guards 13 may be colored (as green) to render them especially inconspicuous, when attached to shrubbery. Being slender, but weighted slightly by the lowermost guard 13, the diffuser does not swing to any extent in the wind.

Various changes may be made to the form of the invention herein shown and described, without departing from the spirit of the invention or scope of the claims.

What is claimed is:

1. In a receptacle for a volatile liquid adapted to be diffused into the atmosphere, an elongated body portion, liquid-supporting material secured to and extending along said body portion, comprising a plurality of substantially conical-shaped tufts with their apices inwardly, means for supporting said body portion at one end thereof, and a guard member at the other end of said body portion, surrounding the tufts adjacent thereto, said guard member having a side wall, arcuate in horizontal cross section, with the inner face of said side wall spaced from said body portion and the outer portions of said tufts imbedded in said guard member, whereby a pocket is formed at said other end.

2. In a repellent liquid diffuser, an elongated body portion, repellent liquid-supporting material, disposed around and longitudinally of said body portion, and guard means at a terminal of said body portion, said guard means comprising a thimble having side walls with portions of said material imbedded therein, an end wall and a mouth surrounding said body portion.

3. In a diffuser for repellent liquids, constructed and arranged to be inserted into the narrow mouth of a bottle containing repellent liquid and withdrawn therefrom, said diffuser including a slender body portion, comprising a pair of entwined lengths of material, means at one end thereof for supporting said body portion, comprising a bendable elongation of said body portion, repellent liquid-supporting material disposed along said body portion, extending between said entwined lengths, and free of said elongation, and means to prevent repellent liquid from sweeping along said elongation, comprising a slender guard member of material having non-absorbent qualities with respect to said liquids extending longitudinally of a portion of the length of liquid-supporting material and disposed next adjacent the inner end of said elongation.

4. In a diffuser for repellent liquids, constructed and arranged to be inserted into the narrow mouth of a bottle containing repellent liquid and withdrawn therefrom, said diffuser including a slender body portion, comprising a pair of entwined lengths of material, means at one end thereof for supporting said body portion, comprising a bendable elongation of said body portion, repellent liquid-supporting material disposed along said body portion, extending between said entwined lengths, and free of said elongation, and means to prevent repellent liquid from creeping along said elongation, comprising a slender guard member of material having non-absorbent qualities with respect to said liquids extending longitudinally of a portion of the length of liquid-supporting material and disposed next adjacent the inner end of said elongation, a portion of the material, having non-absorbent qualities, overlaying and being imbedded in a portion of the first-named material where the last-named material overlays the material having absorbent qualities.

ROBERT H. HARKINS.

REFERENCES CITED

The following references are of record in the file of this patent:

UNITED STATES PATENTS

| Number | Name | Date |
| --- | --- | --- |
| 2,238,476 | Monteith | Apr. 15, 1941 |
| 2,086,046 | Preston | July 6, 1937 |
| 1,109,567 | Clifford | Sept. 1, 1914 |
| 1,683,792 | Naumburg | Sept. 11, 1928 |
| 1,839,073 | Wright | Dec. 29, 1931 |
| 2,218,037 | Duers et al. | Oct. 15, 1940 |

FOREIGN PATENTS

| Number | Country | Date |
| --- | --- | --- |
| 798,387 | French | May 15, 1936 |

Certificate of Correction

Patent No. 2,418,878.                                                          April 15, 1947.

ROBERT H. HARKINS

It is hereby certified that errors appear in the printed specification of the above numbered patent requiring correction as follows: Column 2, line 14, for "construction" read *construct*; column 5, lines 14 and 15, for "sweeping" read *creeping*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*